Oct. 11, 1966 R. M. ASHBY ETAL 3,278,683

CHARACTER BEAM GENERATING SYSTEMS

Filed Sept. 27, 1962

13 Sheets-Sheet 1

INVENTORS
EUGENE A. HOLMES III
ROBERT M. ASHBY
BY L. Lee Humphries
ATTORNEY

Oct. 11, 1966 R. M. ASHBY ETAL 3,278,683

CHARACTER BEAM GENERATING SYSTEMS

Filed Sept. 27, 1962

13 Sheets-Sheet 2

*INVENTORS*
EUGENE A. HOLMES III
ROBERT M. ASHBY
BY L. Lee Humphries
ATTORNEY

INVENTORS
EUGENE A. HOLMES III
ROBERT M. ASHBY
BY
L. Lee Humphries
ATTORNEY

*INVENTORS*
EUGENE A. HOLMES III
ROBERT M. ASHBY
BY
S. Lee Humphries
ATTORNEY

INVENTORS
EUGENE A. HOLMES III
ROBERT M. ASHBY
BY
L. Lee Humphries
ATTORNEY

INVENTORS
EUGENE A. HOLMES III
ROBERT M. ASHBY
BY L. Lee Humphries
ATTORNEY

INVENTORS
EUGENE A. HOLMES III
ROBERT M. ASHBY
BY
L. Lee Humphries
ATTORNEY

INVENTORS
EUGENE A. HOLMES III
ROBERT M. ASHBY
BY L. Lee Humphries
ATTORNEY

Oct. 11, 1966 R. M. ASHBY ETAL 3,278,683

CHARACTER BEAM GENERATING SYSTEMS

Filed Sept. 27, 1962

13 Sheets-Sheet 9

INVENTORS
EUGENE A. HOLMES III
ROBERT M. ASHBY
BY L. Lee Humphries
ATTORNEY

INVENTORS
EUGENE A. HOLMES III
ROBERT M. ASHBY
BY L. Lee Humphries
ATTORNEY

| | U/L | CO–11 | | | | $R_1$–4 | |
|---|---|---|---|---|---|---|---|
| BLANK | – | 0 | 0 | 0 | 0 | – | – |
| BLANK | – | 1 | 1 | – | – | – | – |
| @ | 1 | 0 | 0 | 0 | 1 | 0 | 1 |
| 2 | 0 | 0 | 0 | 0 | 1 | 0 | 1 |
| Q | 1 | 0 | 0 | 0 | 1 | 1 | 0 |
| q | 0 | 0 | 0 | 0 | 1 | 1 | 0 |
| A | 1 | 0 | 0 | 0 | 1 | 0 | 1 |
| a | 0 | 0 | 0 | 0 | 1 | 0 | 1 |
| Z | 1 | 0 | 0 | 0 | 1 | 1 | 0 |
| z | 0 | 0 | 0 | 0 | 1 | 1 | 0 |
| | | | | | | | |
|---|---|---|---|---|---|---|---|
| # | 1 | 0 | 0 | 1 | 0 | 0 | 1 |
| 3 | 0 | 0 | 0 | 1 | 0 | 0 | 1 |
| W | 1 | 0 | 0 | 1 | 0 | 1 | 0 |
| w | 0 | 0 | 0 | 1 | 0 | 1 | 0 |
| S | 1 | 0 | 0 | 1 | 0 | 1 | 1 |
| s | 0 | 0 | 0 | 1 | 0 | 1 | 1 |
| X | 1 | 0 | 0 | 1 | 0 | 0 | 0 |
| x | 0 | 0 | 0 | 1 | 0 | 0 | 0 |
FIG. 13a
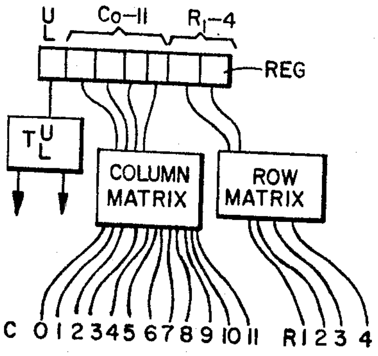
FIG. 13b
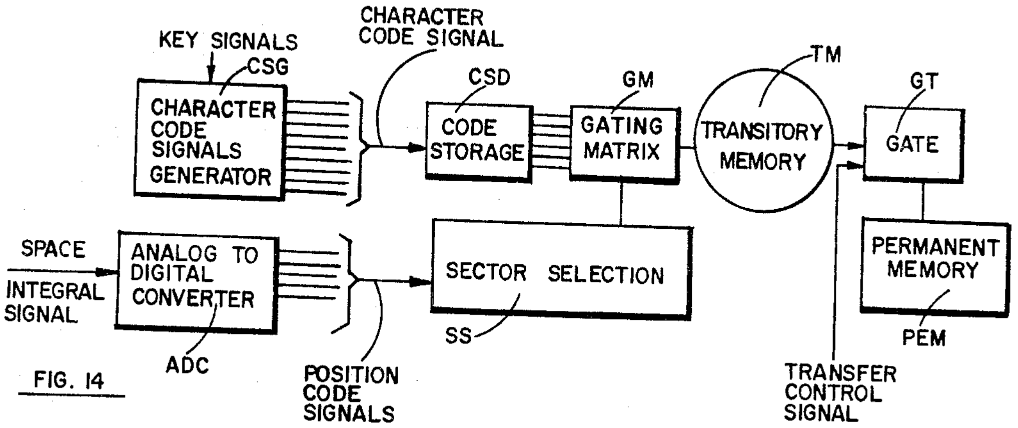
FIG. 14
INVENTORS
EUGENE A. HOLMES III
ROBERT M. ASHBY
BY L. Lee Humphries
ATTORNEY INVENTORS
EUGENE A. HOLMES III
ROBERT M. ASHBY
BY
L. Lee Humphries
ATTORNEY Oct. 11, 1966

R. M. ASHBY ETAL 3,278,683

CHARACTER BEAM GENERATING SYSTEMS

Filed Sept. 27, 1962

13 Sheets-Sheet 13

INVENTORS
EUGENE A. HOLMES III
ROBERT M. ASHBY
BY

L. Lee Humphries
ATTORNEY

United States Patent Office 3,278,683

Patented Oct. 11, 1966

3,278,683

CHARACTER BEAM GENERATING SYSTEMS

Robert M. Ashby, Pasadena, and Eugene A. Holmes III, Whittier, Calif., assignors to North American Aviation, Inc.

Filed Sept. 27, 1962, Ser. No. 226,615
2 Claims. (Cl. 178—30)

This invention relates broadly to means for translating electrical input signals into a beam of electrons, shaped to represent a character, such as a number or a letter; where the character is designated by the particular coding or arrangement of the electrical input signals. In particular, the invention is concerned with a cathode ray tube display and/or printing device which may be operated either through a manual keyboard producing the electrical character selection signals or may be operated directly from a computer to permit very high speed printing. In further particular, the invention contemplates the use of a cathode ray tube display surface to make it possible to edit and modify information to be printed or entered into a computer prior to the actual effecting of such entry.

In the present state of the data handling art various types of printers have been developed for printing out computer data, and automatic typewriters have been developed which are adapted for either input or output. In general, the printers are arranged to operate at a rate of speed in the neighborhood of 10 to 20 lines per second and use hammers or type bars which are selectively actuated through solenoids in order to accomplish the desired printing. This technique is generally employed in order to permit the development of a suitable number of copies. Where very high speed printing is desired, at a rate measured in the terms of the number of pages which can be printed in a given time, the cathode ray tube has been employed to develop an entire television raster of a page to be printed which is then passed through a xerographic printing system wherein a charge pattern representing each character is translated into visible print.

The necessity for hammer actuation in order to provide the desired number of copies is no longer present in view of the recent development of inexpensive techniques for translating a single printed copy into a plurality of copies. For example, a xerographic offset master can be prepared directly from the face of a cathode ray tube and then transmitted to a printing machine to produce thousands of excellent copies thereof.

Accordingly, it now becomes evident that the separate existence of automatic typewriters, such as the "Flexiwriter," hammer-actuated printers, cathode ray tube display devices, cathode ray tube page at-a-time printers, may no longer be justified.

The present invention has been developed to make it possible selectively to operate a character beam generating device as an input device to a printer or computer with the capability of editing and/or modification before printing or input; and also to make it possible to utilize the character beam forming arrangement to provide a high speed display and/or printing system.

According to the basic concept of the present invention, code signals generated either as a function of computer output signals or as keyboard input signals are translated through a character matrix into a beam configuration shaped according to the desired character. The beam is then deflected along a line or row position according to the count, summation, or integral of the space requirements for each of the character beams.

In the preferred arrangement of the invention, the deflected beam is then caused to impinge upon a cathode ray tube surface which, in one mode of operation, may have a permanent memory characteristic, or, in another mode of operation, may have no memory but be caused to retain its information through the use of a holding beam.

The invention also contemplates an ultra high speed printing system wherein the character beam is displayed only instantaneously and the printing mechanism is actuated to move the printing surface continuously over the surface of the cathode ray tube. In this arrangement the character beams may be skewed as they are displayed so as to compensate for the movement of the printing paper.

In the high speed printer operation of the invention, the impinging of the selected character beam upon a surface of the cathode ray tube may be employed to develop an electrostatic charge of xerographic printing, or to develop an optical representation for photographic printing. The important improvement provided by the invention over existing high speed cathode ray tube printers is that only a line of print is developed at a time. As each cathode ray tube line presentation is transferred to the print out means, the cathode ray tube beam is caused to return in synchronism therewith to permit the starting of a new line. This single line translation technique of the invention makes it possible to accomplish a considerable simplification in the deflection circuits employed for the cathode ray tube and also, it will be seen, makes it possible to utilize the same system as an electronic typewriter for input to, or output from, a computer.

Thus, in the input-output mode of use of the electronic printing technique of the invention, the cathode ray tube surface may be arranged to provide both a visual indication of the information which is to be printed and, simultaneously, a printing surface representation. An operator may then review or edit a line of type before it is entered into a computer or translated into print by observing the visual display and may, through appropriate means, modify the character representations thereon before generating a signal causing the translation of the displayed characters into print or into computer input signals.

The line-at-a-time editing and character modification possibility afforded by the invention makes it possible to use variable type spacing and to obtain a preprinting display on the cathode ray tube in order to determine the correction to be made for justification of print so that each line is the same total length.

The generic aspect of the present invention, accordingly, is the development of a character-shaped beam through the means of a selection control circuit controlled by electrical input signals derived either through a keyboard or a computer. The character-shaped beam is then positioned along a line display or a line for printing in accordance with a signal indicating the space position. This generic feature of the invention may be employed in a variety of modes of operation as well as in a variety of combinations and sub-combinations as will be discussed in the detailed description which follows.

The invention may be utilized with a storage tube or a tube wherein the display or charge is regenerated or without storage for continuous printing. It may be used for printing with or without editing or preprinting justification, or for electronic entry into a computer, affording the opportunity to edit the display information before actuating an entry signal or line return signal.

The beam forming structure provided by the invention may take several forms. In one arrangement of the invention a plurality of vertical strips are selected under the control of character column selection signals derived either from a keyboard or computer. Each strip is made of a metal suitable for causing the acceleration of the respective column, groups of character shapes being stamped out of the strip. Thus, a beam developed from a hot cathode may be drawn toward a single column of the matrix and is then deflected vertically and horizontally so as to position the selected column of character beams so that only a single character beam impinges on the cathode ray tube display and/or printing surface at the desired line position.

Another character beam selection technique, according to the invention, involves the use of a photocathode. Two basic techniques are contemplated. According to one technique a series of column lights are provided, each for illuminating a respective column containing transparent configurations representing the characters. These column lights then cause the photoemission of respective electron character beams from the photocathode. The entire column may then be deflected in the same manner as in the electron beam generating system mentioned above. Another technique utilizing a photocathode is one wherein the initial character selection is obtained entirely through optical means whereby only a single character is focused upon the photocathode and is then accelerated and directed towards the displaying and/or printing surface of the cathode ray tube.

Two general display techniques are contemplated by the invention. According to one technique, the character-shaped beam is passed through a vertical deflection system which causes the beam to be doubly displayed so that each character is presented substantially simultaneously to a visual display surface and to a printing display surface or charging area. The operator may then view, edit and/or modify the display, before generating an entry or print-out signal. The print-out signal may correspond to the usual carriage-return signal generated at the end of a line in an electric typewriter.

Another arrangement contemplated by the invention permits both display and printing through the use of a single beam. In this case, the cathode ray tube display is observed by looking through the tube surface to the inside of the tube to observe the phosphorescent light caused by the character beam striking the inside surface of the tube, and printing is then accomplished from the outer surface of the tube where an electrostatic character pattern is established.

In the electronic typewriter embodiment of the invention various typing features are accomplished in a very effective manner. For example, an electronic tab is possible by comparing an electronic space-representing signal to preselected tab position signals in order to generate a tab stop signal. Provision may also be made for setting electronic left-hand and right-hand margins and for accomplishing electronic forward and back spacing.

Accordingly, it is a general object of the present invention to provide improved means for translating electrical input signals into a character-shaped beam of energy.

Another object of the invention is to provide an electronic typewriter which may be employed as an input device for a computer, as a means for editing type before printing, as an output device for a computer, or as a high speed printer.

A further object is to provide an electronic typewriter wherein editing is possible before printing and erasures may be made electronically.

Still another object is to provide an improved character selection technique for a cathode ray tube display device and/or printer.

Yet a further object is to provide improved techniques for generating and storing selected characters in a cathode ray tube printing system.

A specific object of the invention is to provide an electronic typewriter employing a cathode ray tube which responds to signals available either through keyboard or computer and which may be employed as an input or output device or as a printing device.

The novel features which are believed to be characteristic of the invention, both as to its organization and the method of operation, together with further objects and advantages thereof, will be better understood from the following description considered in connection with the invention are illustrated by way of examples. It is to be expressly understood, however, that the drawings are for the purpose of illustration and description only and are not intended as a definition of the limits of the invention.

Figure 2:
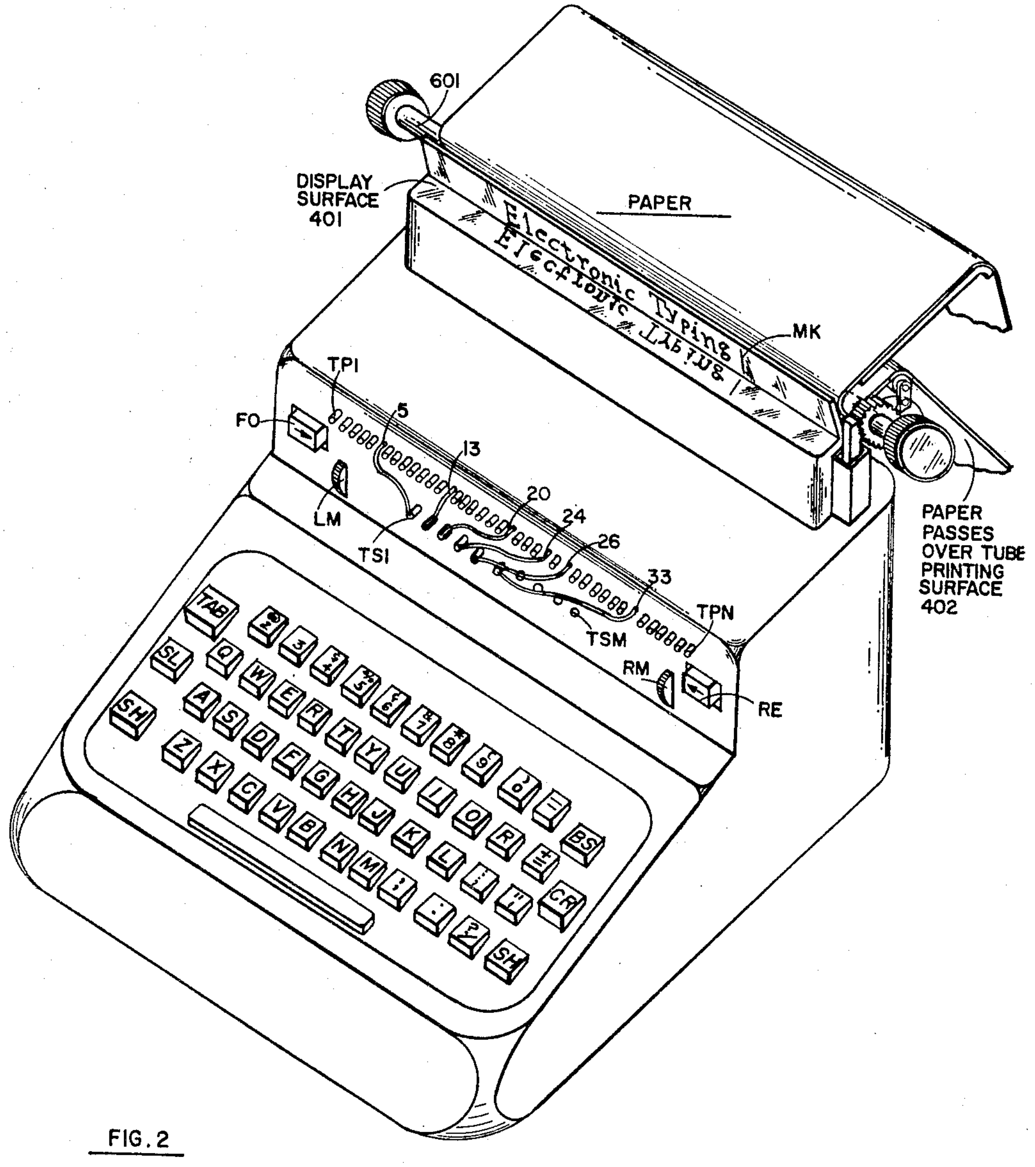
FIG. 2 is a perspective view of an electronic typewriter according to the invention.
Figure 3:
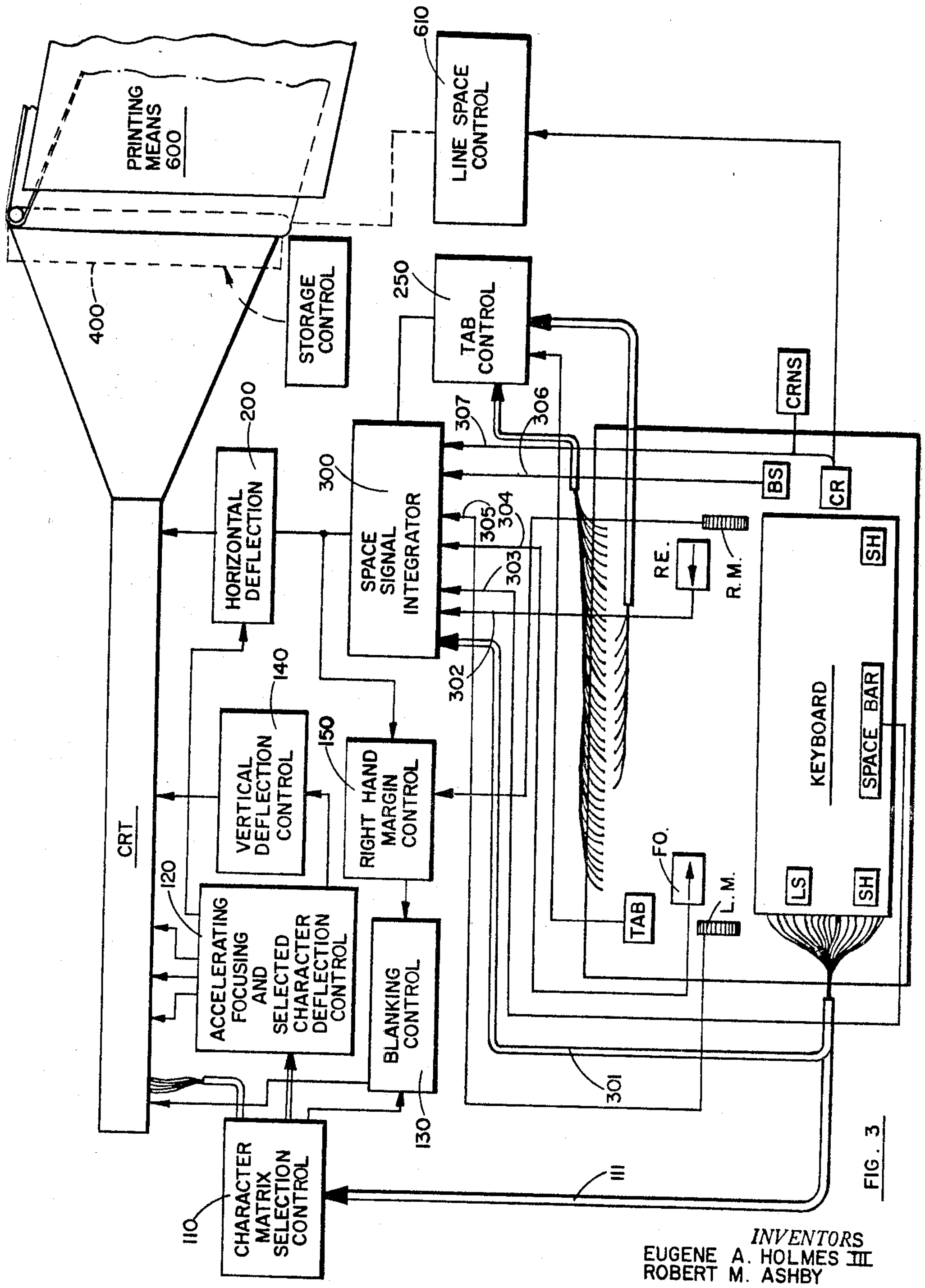
FIG. 3 shows a cathode ray tube typewriter according to the invention.
Figure 4:
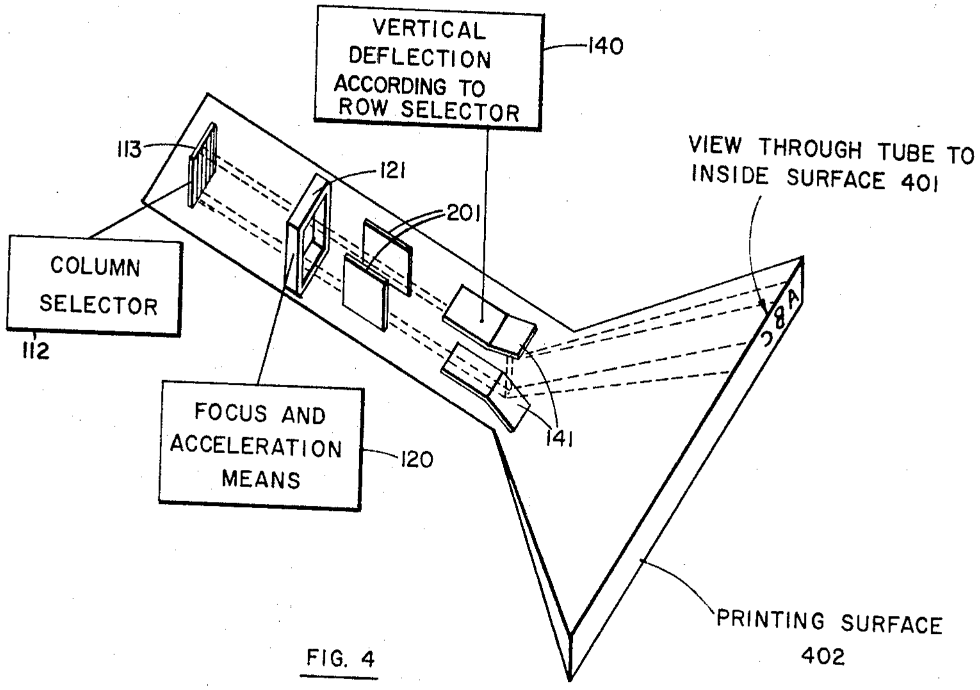
FIG. 4 illustrates one form of cathode ray tube and associated controls suitable for the system of FIG. 3.
Figure 4A:
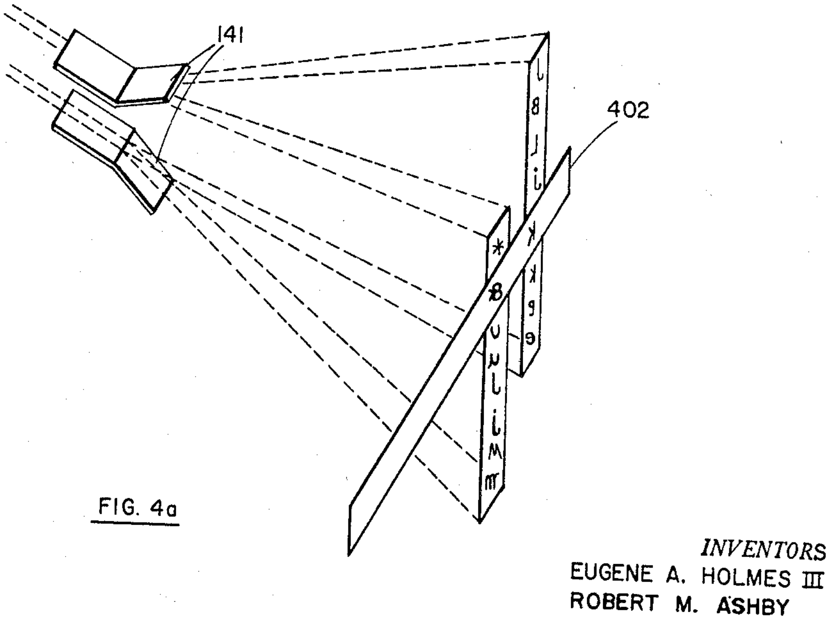
Figures 4B, 4C:
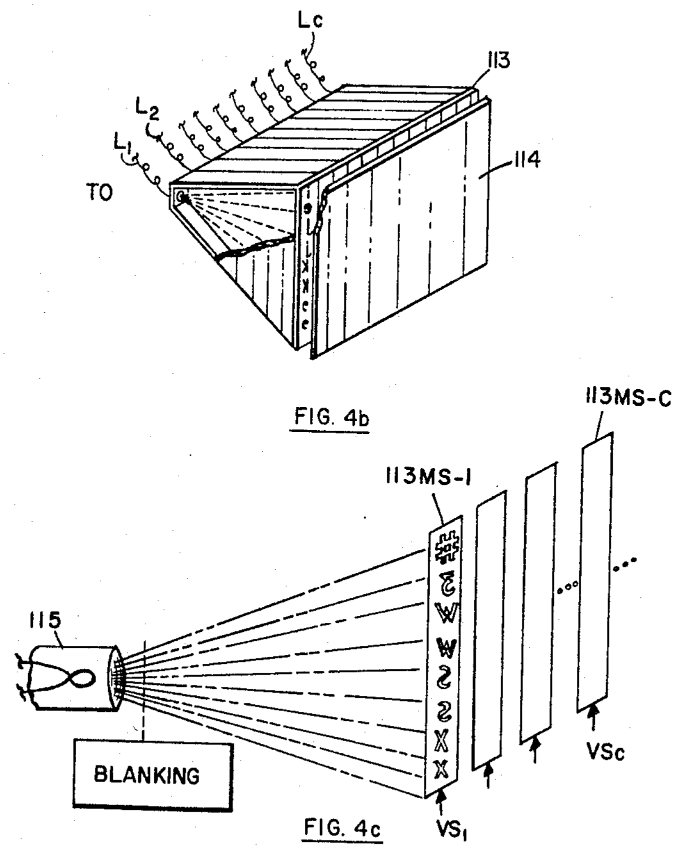
Figure 5:
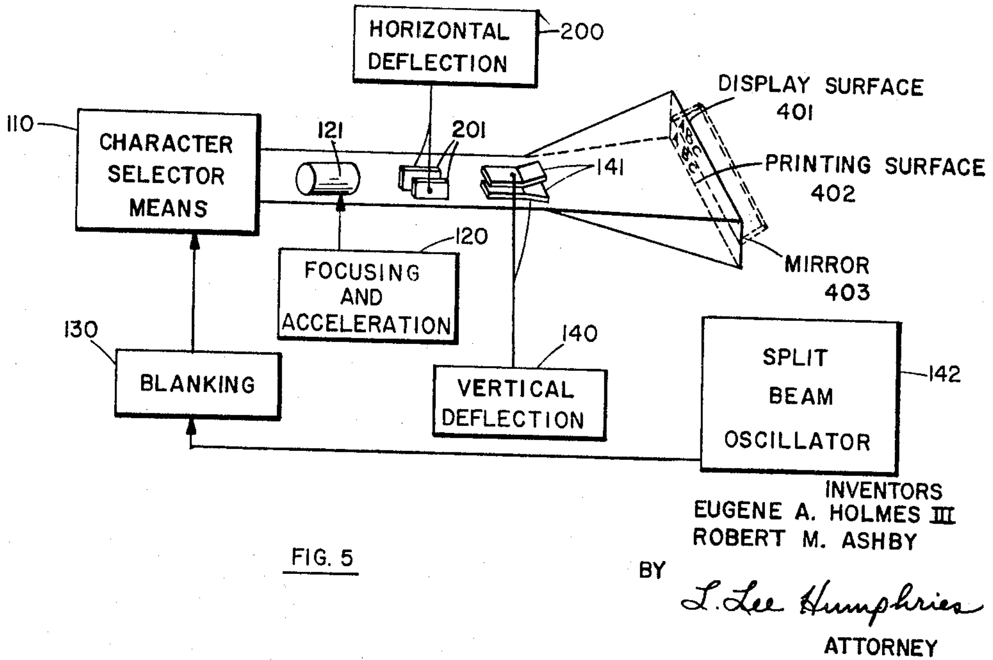
Figure 5A:
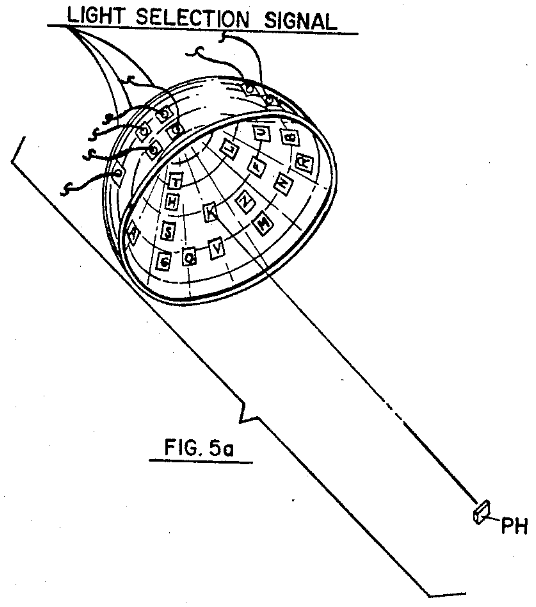
Figure 5B:
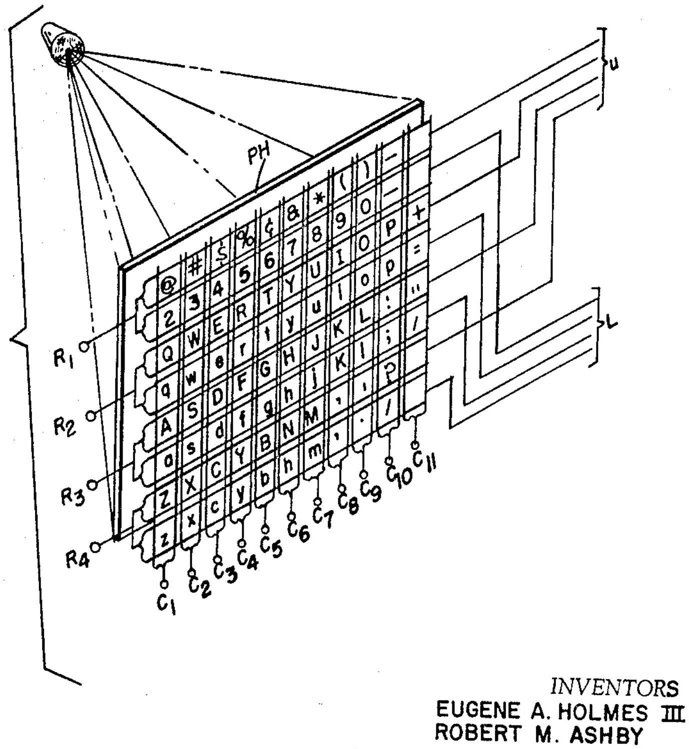
Figure 6:
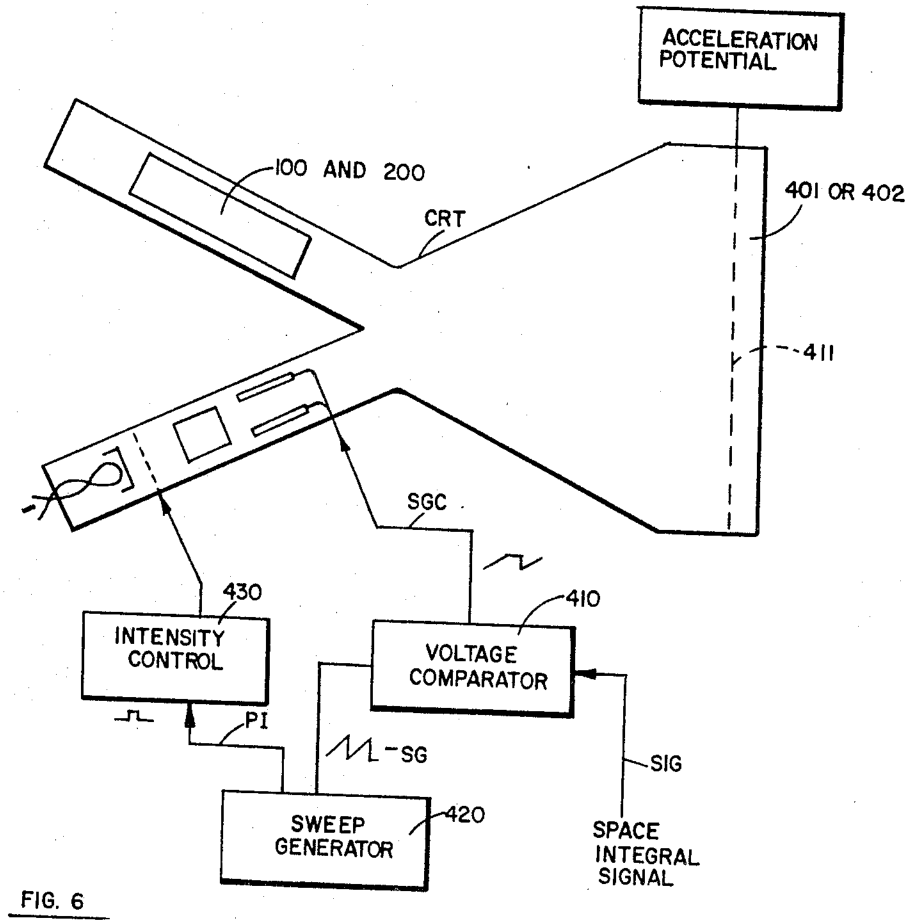
Figure 6A:
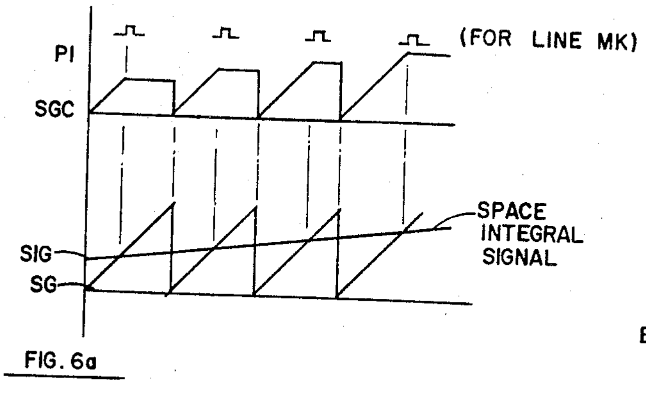
Figure 7:
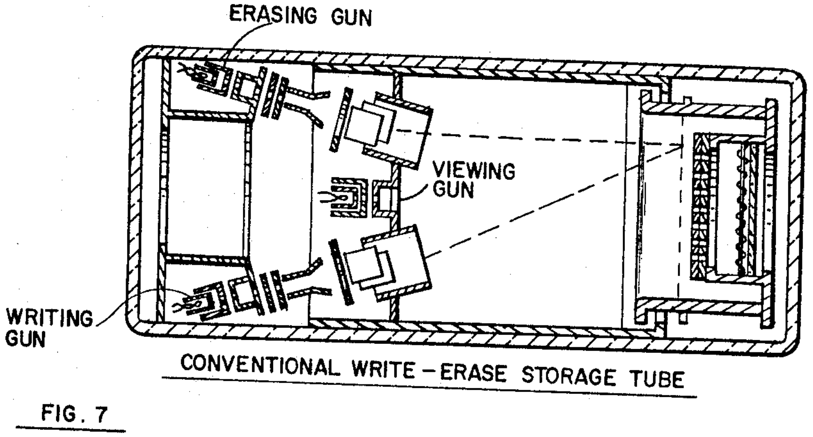
Figure 8:
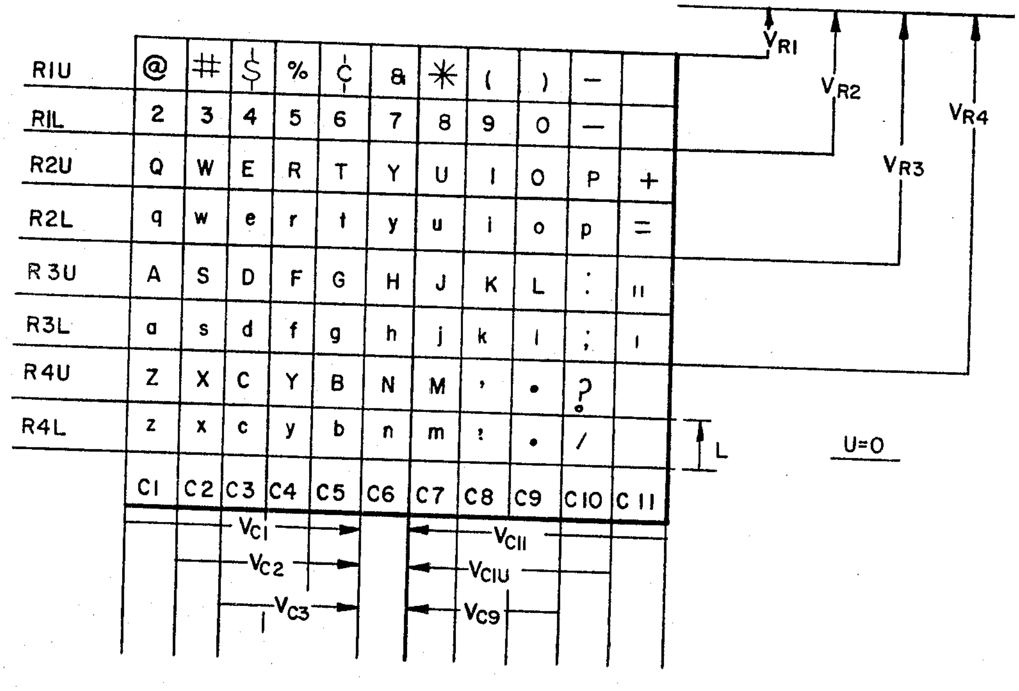
Figure 9:
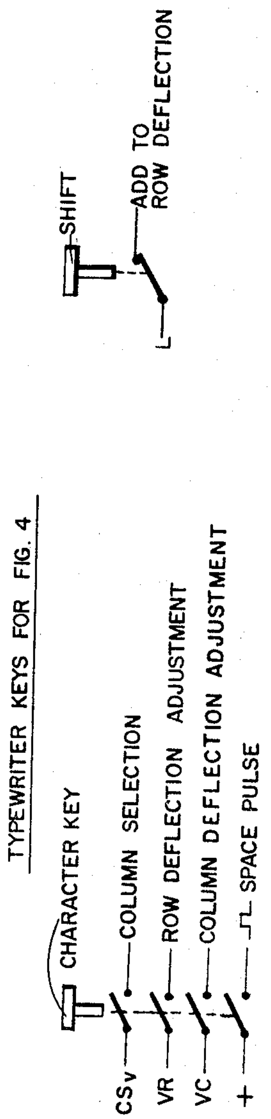
Figure 10:
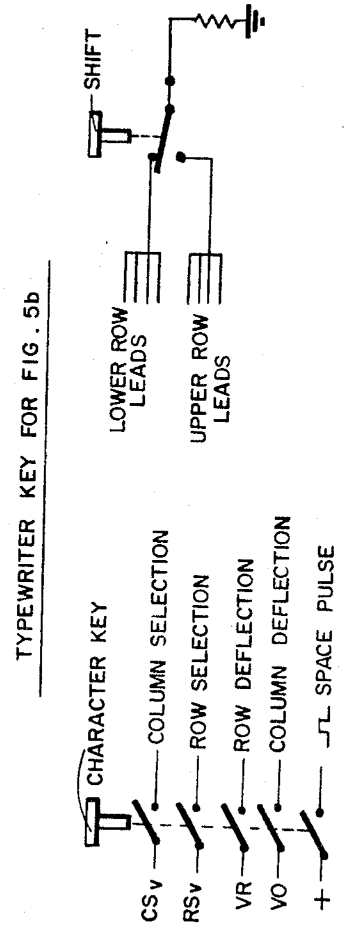
Figure 11:
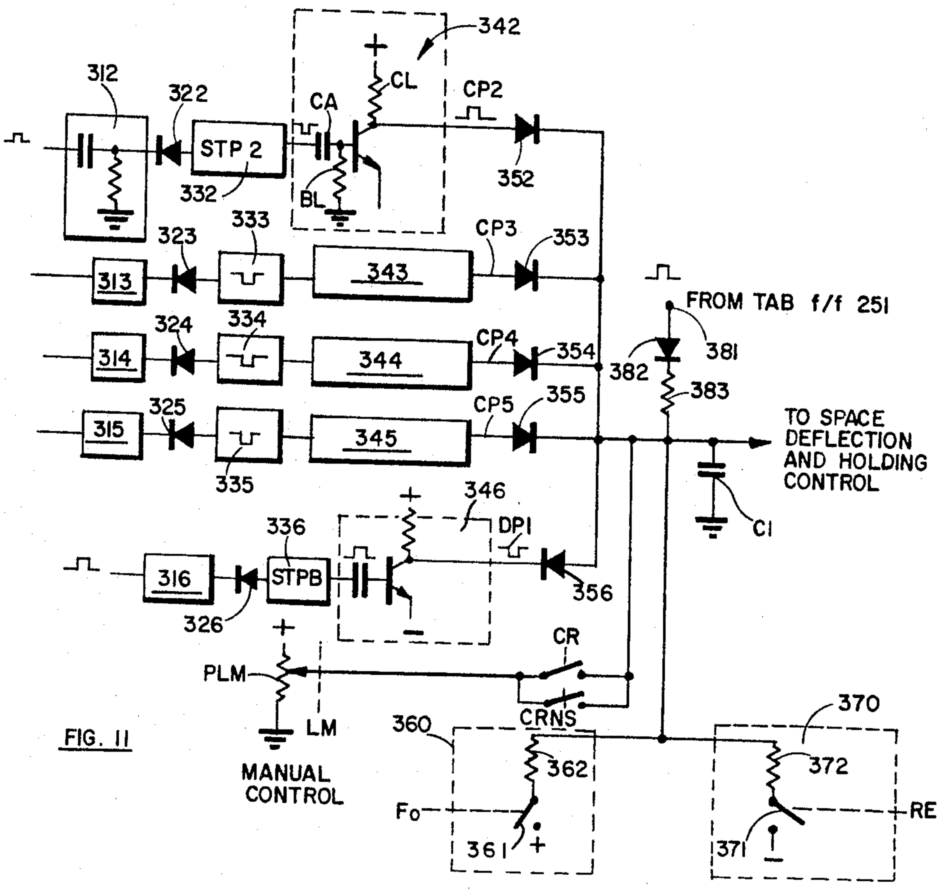
Figure 12:
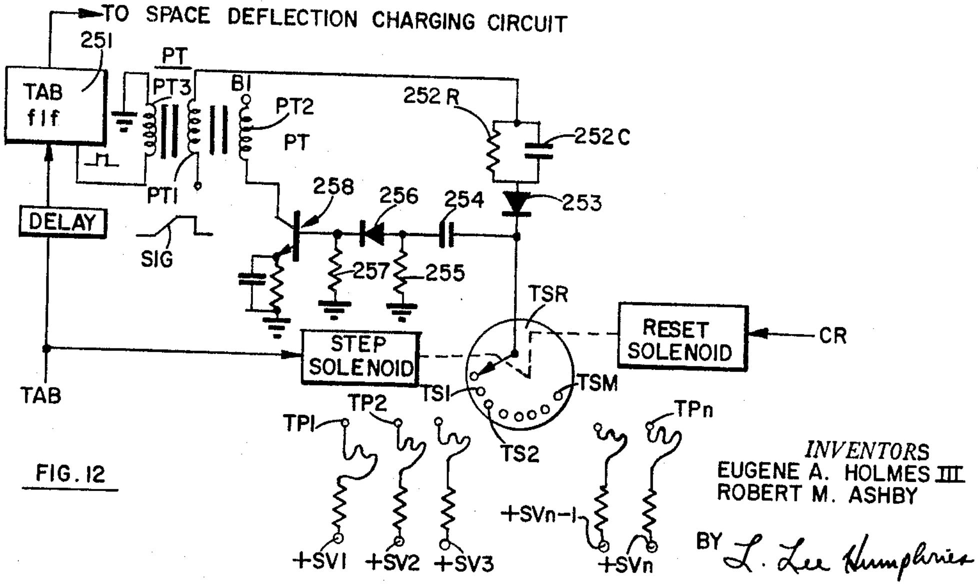
Figure 15:
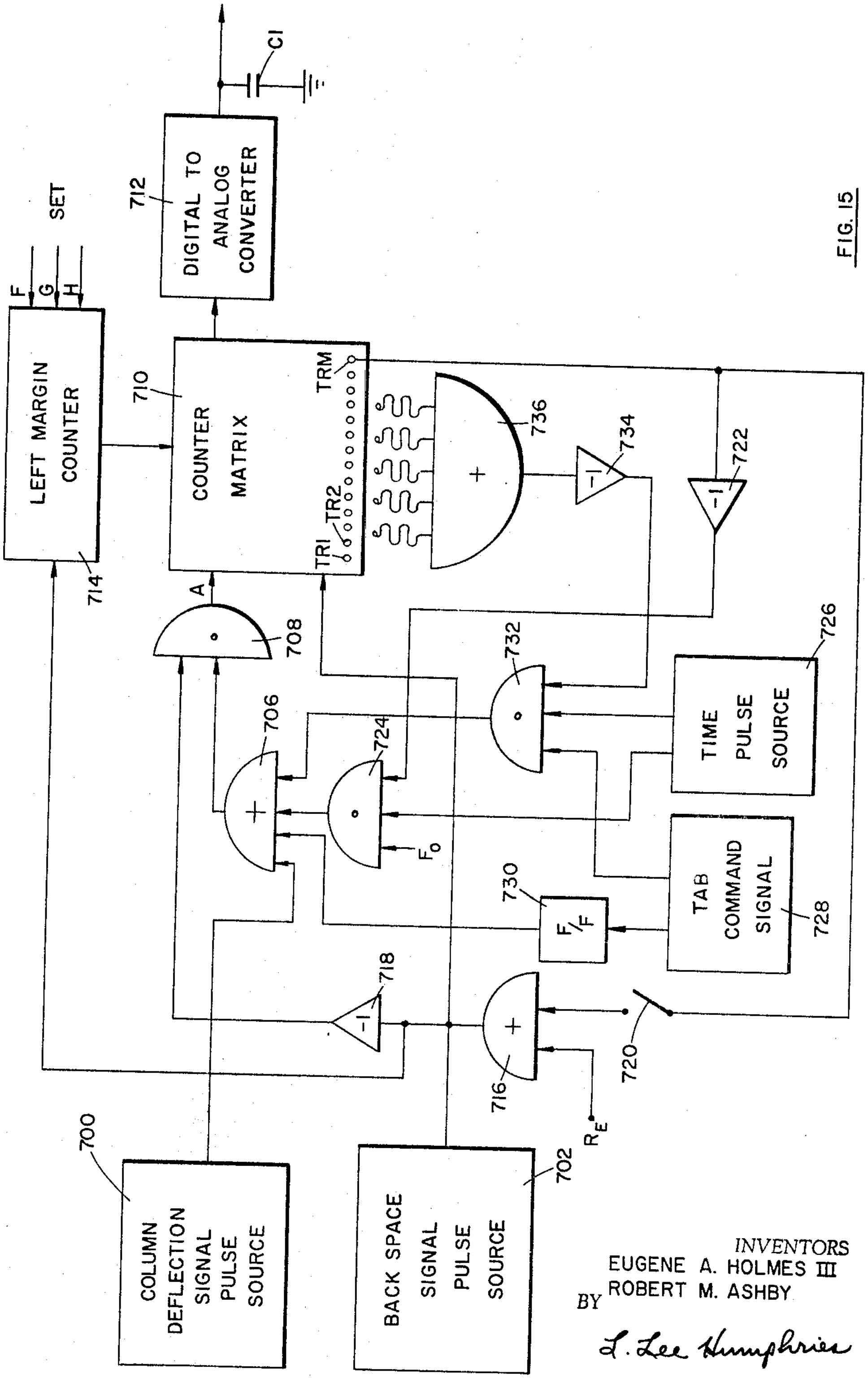

FIG. 4*a* is an expanded view of the vertical deflection means of FIG. 4;

FIG. 4*b* shows an optical column selection technique suitable for character beam selection according to the invention;

FIG. 4*c* shows an electron column selection technique;

FIG. 5 illustrates a cathode ray tube split-beam deflection system;

FIGS. 5*a* and 5*b* illustrate two additional matrix techniques of the invention;

FIG. 6 shows the use of a holding beam for character pattern retention;

FIG. 6*a* is a composite set of wave forms illustrating the operation of the circuits shown in FIG. 6;

FIG. 7 illustrates a cathode ray tube having write and erase capability;

FIG. 8 is a chart of a typical character matrix;

FIGS. 9 and 10 show the general arrangement of keys for the electronic typewriter of the invention;

FIG. 11 is a schematic diagram of a space signal integrator 300 suitable for the system of FIG. 3;

FIG. 12 is a schematic diagram of a tab circuit 250 suitable for the system of FIG. 3;

FIGS. 13*a* and 13*b* illustrate a suitable coding and translation system for providing a computer input to the typewriter of FIG. 2;

FIG. 14 illustrates the capability of data editing and modification before computer entry, according to the invention;

FIG. 15 is a block diagram of a digitized printer control; and

Figure 16:
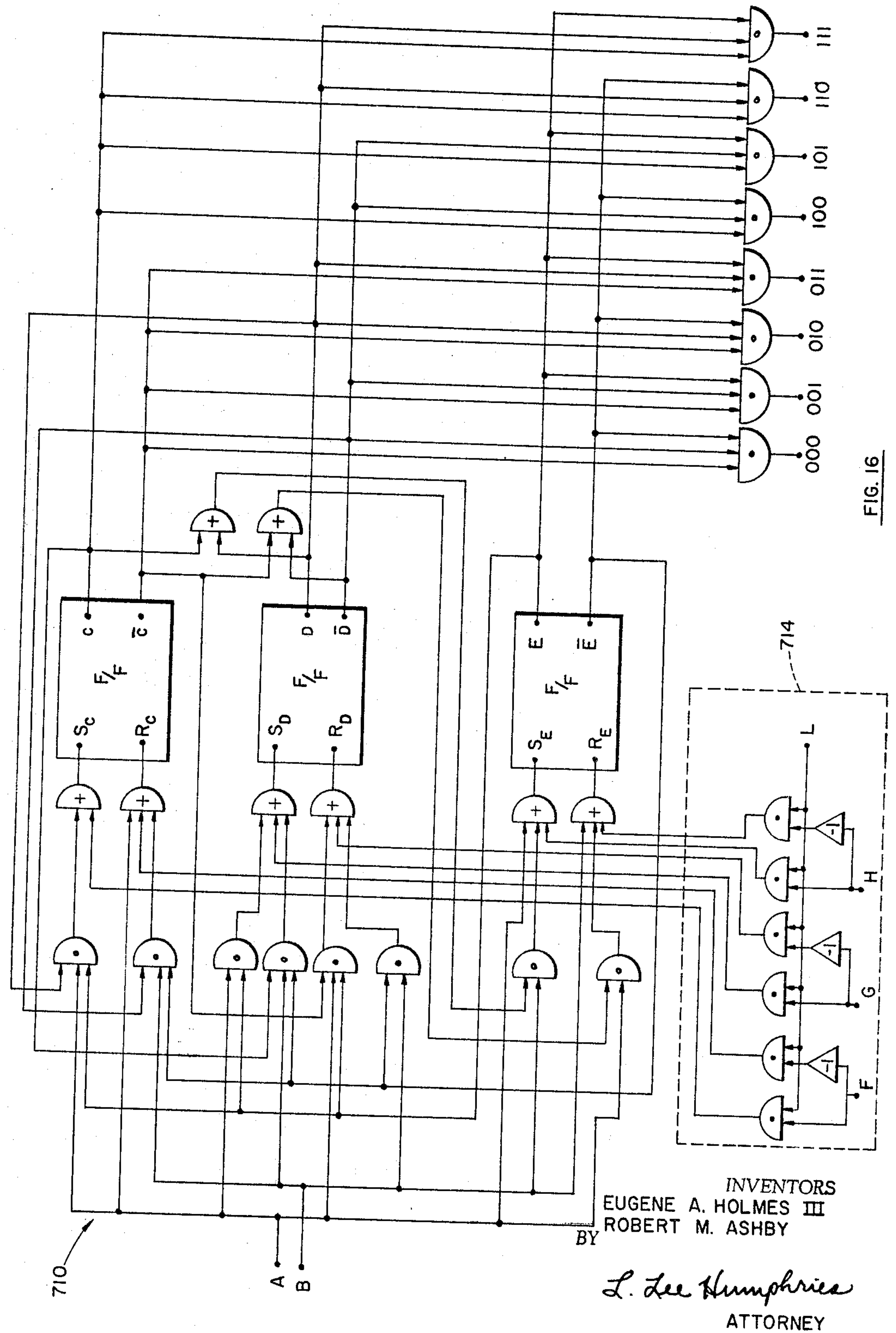

FIG. 16 is a typical counter useful in the circuit of FIG. 15.

Figure 1:
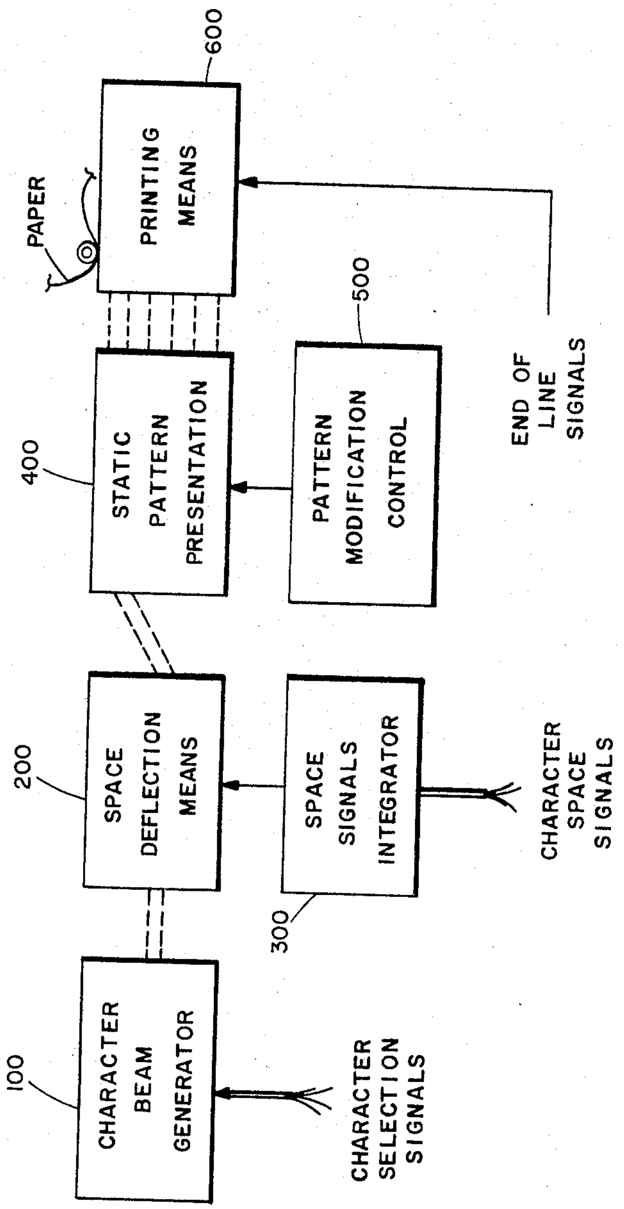
FIG. 1 is a block diagram indicating the general form of a system employing the invention.

Reference is now made to FIG. 1 where a block diagram is shown illustrating the general form of a system embodying the principles of the present invention. As is indicated in FIG. 1, character selection signals are applied to a character beam generator 100 which produces a beam shaped in accordance with the representation of the character signals. The beam is subjected to space deflection means 200 controlled by space signals integrator 300, which in turn receives the character space signals.

Each character has an associated space-designating signal which is generated at the same time the character selection signal is generated, so that integrator 300 is continuously providing an output signal designating the proper position for the next character to be printed or displayed. Thus space deflection means 300 positions the character beam in accordance with the number of characters already represented along the line. At the end of each line, integrator 300 is reset to the left-hand margin position and the character beam is thus positioned so as to be ready to display or print the first character of the next line. The character beam is translated by means of a static pattern presentation device 400 into a visible display or into a display which may not be visible but is suitable for printing. The latter type of display may be the electrostatic charge pattern or a type of invisible chemical reaction.

A pattern modification control device 500 is provided to permit the alteration of the pattern presented by device 400. Device 400 may comprise a holding beam, in the case of the cathode ray tube, or may consist of the storage surface in the cathode ray tube. Means 500 may constitute an electronic sweep circuit for the holding beam in one arrangement of the invention or it may constitute a manual erase device where a storage device is utilized, or may comprise an electrical erase circuit for selectively erasing characters to permit the adding of characters at any particular position along a line. Means 500 covers any arrangement permitting character pattern modification before printing. An end-of-line signal is utilized to actuate printing means 600 which receives a representation of the static pattern presentation of the entire line developed through space deflection means 200 and provides a corresponding printed output. Means 600 includes a line spacing arrangement for printing successive lines in the desired order. The line spacing arrangement may comprise conventional platen actuating means.

The general appearance of an electronic typewriter employing the basic principles of the present invention is illustrated in FIG. 2. The keyboard of this typewriter appears, for the most part, as a conventional typewriter keyboard and will not be discussed to the extent it is conventional. It will be noted, however that adjustments LM and RM are provided to set left-hand and right-hand margins which, in the case of the electronic typewriter, are voltage settings. Also provided are forward and reverse control buttons FO and RE which permit the operator to adjust the typing position designated by a marking signal MK. It will also be noted that a provision is made for setting electronic tabs. This is provided by having a tab position plug in any positions TP1 through TPN which are entered into tab selection sockets TS1 through TSM. As an example, 40 tab positions TP may be provided out of 120 typical line spaces, whereas the tab selections may number 10. This means that any of 40 possible tab positions may be selected to provide up to 10 actual tabs which are set. The tabs are set by the operator in the order that they appear from left to right. Thus the first tab position indicated to be selected in FIG. 2 is TP5 which is entered into tab selection position TS1, tab TP13 is noted to have been entered into tab selection TS2, etc.

An important distinction between the electronic typewriter of FIG. 2 and a conventional typewriter is that no movable carriage is present. The electronic carriage, so to speak, is moved electronically by varying the deflection voltage which is supplied to the character beam of cathode ray tube, the display surface 401 of which is visible at the top of the typewriter.

In the illustrative case of FIG. 2, a cathode ray tube is used as character beam generator 100 and provides the double function of display through presentation surface 401 for the operator's review, and establishment of a printing charge or optical pattern for printing on a surface 402 (not visible in FIG. 2). This double presentation technique may be accomplished with a single cathode ray tube beam by using a beam splitting deflection oscillator as is discussed below (FIG. 5), or it may be accomplished with separate beams for display and printing. After the electronic type has been edited by the operator by viewing display surface 401 through a mirror 403, the paper for printing is passed to appropriate printing means 600 (not shown in FIG. 2) which may constitute xerographic developing means such as produced by the Haloid Co., or other printing means such as light sensitive printers where surface 402 produces a light image of the selected character beams or the printing means could constitute a chemical processing system sensitive either to light or heat or electrical characteristic.

It will also be noted that the typewriter includes a platen 601 which may be turned manually by the operator when inserting paper or may be actuated automatically each time the carriage return button CR is pressed by means of a solenoid 602 or other line space control device.

In the general operation of the electronic typewriter, the operator would normally push the carriage return button CR to cause the marking line MK to return to the left-hand margin position which is settable by means of knob LM which adjusts the desired voltage for setting this margin. Each tab may then be set by the operator by selecting the desired position by means of the appropriate plug, and by checking the position by actuating tab button TAB to determine where the marking line MK stops.

After the tabs have been set, the operator may then commence to actuate the carriage return CR and the tab for the first paragraph. It is interesting to note here that provision may be made, as indicated in FIG. 3, to accomplish carriage return without spacing. In FIG. 3 this is accomplished through a switch CRNS which causes the resetting of integrator 300 to the left-hand margin controllable through the setting of knob LM, but does not actuate the line space control device 610.

Referring again to FIG. 2, as each character key is pressed, an electrical selection is made which operates on the cathode ray tube and causes the generating of the character beam which is then displayed and caused to develop a printing charge on surface 402. Each key actuation also develops a charge or storage in space signals integrator 300 corresponding to the amount of space required for the character. This makes it possible to arrange the typewriter for variable space typing such as in an IBM Executive typewriter.

One of the important features of the electronic typewriter is the ability to display an entire line of type before printing to permit editing and modification of the type for printing and thus making it possible to develop justified type and/or to make corrections before the visible and permanent record is developed.

The general form of one system utilizing a cathode ray tube actuated through a key board to provide an electronic typewriter is illustrated in FIG. 3. The various means of FIG. 3 are related to the general block of FIG. 1 by utilizing the first and/or most significant digit of the respective means in FIG. 1. Thus the various devices that perform the functions of character beam generator 100, are in the 100 series. It will be noted, therefore, that a character matrix selection control device 110 receives appropriate signals from the typewriter keyboard and provides control signals which are applied to cathode ray tube CRT to select the desired beam. It will be understood, of course, that an optical beam selection is possible according to the principles of the present invention, and therefore, the beam selection need not be included as part of the cathode ray tube but may be a separate optical selection utilized to actuate a photocathode within the tube (see FIG. 5*a*).

Other means considered as part of the character beam selection control 100 shown in FIG. 3 are the accelerating, focusing, and selected character deflection control device 120; blanking control 130, which may be utilized to turn a light on and off in the photooptical technique of the invention or to control a grid in the electron beam operation; a vertical deflection control 140, which receives certain signals from deflection control 120, to provide adjustment for the selected character position; and a right-hand margin control 150 which may be utilized to blank the tube at the right-hand margin to prevent any printing beyond the margin.

In a similar manner, various other basic means of FIG. 1 are shown in more specific form in the cathode ray tube typewriter arrangement of FIG. 3. A tab control 250 is shown which may be considered to form part of space deflection means 200 of FIG. 1, and is operated by selecting the desired tab through the tab position TP1 through TPN and the desired tab selection position TS1 through TSM discussed with reference to FIG. 2 above.

In one form, tab control 250 may comprise a flip-flop or bistable device 251 (see FIG. 12) which is turned on as soon as the tab key is actuated and which, while on, causes the development of the continuously increasing horizontal deflection signal in space signals integrator circuit 300. This causes the character beam to be deflected to the right until the selected tab voltage is equal to the voltage of the position signal produced by integrator 300.

Space signals integrator 300 receives seven signals or groups of signals. Bus 301 carries the space signals for each character from the keyboard; lead 302 carries the voltage from switch RE which may cause the discharging of an integrating capacitor in circuit 300 or may cause the counting down of a digital device therein; lead 303 carries the space bar signal for causing charging or counting up in circuit 300 (two space bars can be employed for variable spacing); lead 304 carries the FO switch voltage for moving the electronic carriage to the right by counting up or integrating positively; lead 305 carries the voltage produced by the setting of knob LM designating the left-hand margin; lead 306 carries a discharge or count down signal from back space switch BS; and lead 307 carries the carriage return signal either from CR or from CRNS and provides the means for setting integrator or counter 300 to the desired left-hand margin space position designated by the setting of knob LM.

Various techniques for developing a cathode ray tube beam shaped in the form of a selected character and for controlling the tube to obtain a memory or character retention characteristic will be discussed with reference to FIGS. 4 through 7. These figures are designed to illustrate various techniques in a general form without any intention to limit the invention to any particular combination of circuits. Thus various matrix selection techniques are illustrated where a column or particular character is selected and may, in general, be employed with a variety of different types of beam generating devices. In fact, the invention is not particularly limited to the use of a cathode ray tube, although this is the most practical embodiment in the present state of the art.

Referring now to FIG. 4, it will be noted that a column selector 112 selects only a column in this example from a matrix 113 of columns which may be either inside the tube as is illustrated in FIG. 4 or may constitute an external matrix as is illustrated in FIG. 5*a*, where the optical selection is shown. A column of characters thereby selected from matrix 113 is passed through focus and accelerating device 121 (not shown in its actual form but merely as a general means) controlled by means 120.

The selected column of character beams, focused and accelerated through means 121, is then passed through horizontal deflection plates 201 and vertical deflection plates 141. Vertical deflection control circuit 140 provides an effective row selection because the face of the cathode ray tube can only accommodate a single character in vertical position. The visual display may be obtained by utilizing a phosphorescent substance on the inside of the tube, provision being made to permit viewing through the tube to the inside. It will be noted that the characters appear in reverse order on the printing surface over which the paper receives the charge pattern or light patten so that, after transfer, the print on the paper appears in the same order that the visible display appears on the inside of the tube.

A portion of the arrangement of FIG. 4 is expanded in FIG. 4*a* to illustrate the manner in which the selected set of column beams is deflected through plates 141 in order to select the desired row for display on the surface of the cathode ray tube.

FIGS. 4*b* and 4*c* illustrate two suitable arrangements for selecting a column of character beams. In FIG. 4*b* a series of light sources L1 through L*c* are provided, one for each of the columns (*c* total) to be selected. Each source is provided with a means for illuminating a particular column of a character matrix 113 which may comprise a single sheet of plastic with transparent or translucent sections arranged in columns to represent the particular characters which are to be printed. Only one column of characters is illustrated. The turning on of any lights L1 through L*c* is effective then to illuminate a corresponding column of characters and these light beams are then translated through photocathode 114 into corresponding electron patterns which may then be drawn from photocathode 114 in a conventional manner by means of suitable accelerating electrodes. The arrangement of FIG. 4*c* is similar to that of FIG. 4*b* except that a thermionic cathode 115 is employed which emits electrons to cover each of a plurality of metallic strips 113MS–1 through **113MS–*c***. Each metallic strip is then actuated by a suitable selection voltage VS1 through VS*c* and has a series of characters stamped out of it corresponding to the characters of a particular column. Thus a column of characters is selected by applying a suitable accelerating voltage on the desired strip to attract and accelerate electrons therethrough. The other strips are maintained at a bias level which prohibits passage of any beams. A blanking circuit is shown in FIG. 4*c* because it may be necessary to cut off the beam while the character positions are being moved along a line for printing. The blanking circuit is not shown in FIG. 4*b* since the light sources themselves are turned off at the end of the character display.

The selection signals for lights L1 through L*c* or accelerating plates 113MS1 through **113MS*c*** are derived through a keyboard in the case of an electronic typewriter, or may be derived as a function of computer signals. A typical arrangement of selection signals will be discussed with respect to FIG. 8 below.

In the electronic typewriter version of the invention it may be desirable to generate both a visible display and a separate printing pattern such as an electrostatic charge pattern. In this case, it may be desirable to employ an arrangement similar to that illustrated in FIG. 5 where the vertical deflection circuit is actuated by a split beam oscillator 142 which also generates blanking signals applied to selection control 110. In this arrangement the character beam developed under the control of selection control 110, is made to correspond to only a single character and is then passed through focusing means 121 under the control of circuit 120, thence to horizontal deflection plates 201, controlled by horizontal deflection means 200, thence to vertical deflection plates 141 controlled by vertical deflection control device 140. Deflection circuits 140 and 200 receive appropriate signals from the keyboard or from a computer designating the amount of correction required to position the selected beam and so that it will be centered in each of the split beam positions. Horizontal deflection means 200 also receives the space integral signal from circuit 300.

Two typical arrangements of selection means 110 are shown in FIGS. 5*a* and 5*b*, suitable for the type of system of FIG. 5. In FIG. 5*a* each character is arranged for optical display upon the same photocathode PH, the character configurations being arranged for separate illumination along a spherical surface, and a light source is provided for each character position. Thus, this arrangement provides the desired character selection directly and does not require further deflection for position compensation as is required for the system of FIG. 4. The photocathode then emits electrons according to the light pattern placed thereon and such electrons are focused and accelerated to constitute the selected beam.

In the arrangement of FIG. 5*b*, a particular portion of the photocathode is selected through a grid matrix which causes electrons shaped as the desired character to be accelerated towards the display or printing surface. In this case, the entire photocathode is illuminated continuously with electrons being drawn from the photocathode only at such time as the particular window surrounding one beam is selected by applying a suitable potential to all four leads surrounding the window. The arrangement of FIG. 5*b* may also be practiced without the photocathode by generating electron beams shaped directly as the characters and passing them through the potential selection matrix illustrated in FIG. 5*b*. An electron beam grid selection technique of this type is illustrated, for example, in Patent No. 2,862,144 by Joseph T. McManey.

In the description thus far the general technique for accomplishing electronic typing has been discussed and several arrangements for generating the character beam in response to electrical control signals have been discussed. Before going into the particular details of the electronic typewriter it will be helpful to consider two means illustrated in FIGS. 6 and 7 for accomplishing the memory characteristic which may be required to practice certain features of the invention. Reference is made for this purpose to FIG. 6 where a cathode ray tube CRT is shown with means for generating two separate beams, one being the character shaped beam, which has been discussed above, and the other being a holding beam. Only the holding beam portion of the tube is shown in some detail since the other part of the tube may be similar to one of the arrangements discussed above. It will be noted that tube includes a screen referenced as 410 which is designed to establish an electrostatic charge in accordance with the character shape of the beam passed through to surface 401 or 402.

The storage characteristic which may be obtained by use of the screen is now well known, a typical example of storage tube arrangement with holding beam being shown in Patent No. 2,903,618 by George F. Smith.

The important feature to be noted about FIGS. 6 and 6*a* is that the holding beam is not generated continuously to spray electrons completely across screen 411, as is the conventional technique, but rather is caused to sweep across the screen up to the point where the last character has been written. This is accomplished by applying the space integral signal to a voltage comparision device 410 which also receives the output signals of a sweep generator 420. Whenever a signal SG produced by generator 420 reaches an amplitude equal to the space integral signal, the amplitude of the signal SG is clipped to give the appearance of waveform SGC in FIG. 6*a*. Signal SGC follows a signal SG until the level of the space integral signal SIG is reached. This then provides a pulse PI which is applied to intensity control circuit 430 to provide marking line MK.

Since the space integral signal SIG indicates the position of the last character or the position for the next character, the comparison or clipping function of circuit 410 is to limit the holding sweep voltage to the last character position. That is, the character formation is held or memorized only to the point of previous beam display or printing pattern generating. Thus, moving of the electronic carriage by actuating switch RE or BS will automatically accomplish erasure of the previous character memory (which may be both visual and in printing charge) since the holding beam is deflected only to the space position point as indicated by signal SIG. Furthermore, intensity pulse PI will cause automatic moving of the marking line MK with the movement of the electronic carriage with reverse movement, whether caused by backspacing (BS), reverse carriage movement (RE) or carriage return (CR). It should be noted that where the single surface of tube, such as illustrated in FIG. 4, is employed provision should be made to cut off marking beam MK to prevent the printing surface from receiving the marking line. Thus intensity control circuit 430 should include means responsive to split beam oscillator of FIG. 5, for removing MK during the printing period. Where only a single cathode ray tube surface is employed, provision may be made to modify the intensity control provided by control circuit 430 so that the holding beam intensity during the marking period is sufficient to create phosphorescence but is insufficient to create an electrostatic charge for printing.

In some applications of the invention, it may not be desirable to erase the previously stored representations of character beams for all reverse carriage movement as is accomplished with the arrangement of FIG. 6. Accordingly, a controllable erase technique may be provided according to the invention, a typical cathode ray storage tube permitting this technique being shown in FIG. 7. The features of the arrangement of FIG. 7 will not be described in detail since they are amply described in various cathode ray storage tube patents such as Patent No. 2,967,969 by A. C. Stocker.

The important thing to note with respect to FIG. 7 is that separate writing and erasing guns are provided which may be controlled through separate respective deflection plates. The erasing gun may then be positioned as desired to a character in order to wipe out that character alone without disturbing the other characters. This means that the marking or indicating line MK, as discussed above, must be made to move along with the erase gun position.

A suitable technique for operating the invention with the erasing technique of FIG. 7 would be to step the erase gun deflection voltage along with the space integral signal with the erase beam being cut off by a suitable biasing potential when new character beams are generated and with the write beam being cut off when erasing is desired. Thus, write and erase beams are deflected together in this type of operation with the writing gun being turned on whenever a character key is struck or whenever a computer input signal is received indicating a character is to be written, and the erase gun being turned on whenever an input signal is received indicating a character is to be deleted. The marking signal MK may then be produced through the writing gun on a time-shared basis with the generating of either the character writing beam or of the erase beam. Provision must be made, of course, for permitting the display of the marking signal MK prior to each erase in order to determine the precise position of the erase beam for actuating the wiping out of the storage pattern.

Many variations are possible in the arrangement of FIG. 7 without departing from the spirit of the invention. In lieu of separate erasing and writing beams (where the writing beam must be passed through the selection matrix of the invention), the selection matrix may be designed to provide a special window for the erasing beam. The operator's erase signal then will select the erase beam window from the matrix and will modify the accelerating potentials to accomplish the erase. If the optical character selection technique of FIG. 5*a* is employed it would still be possible to employ a single beam where one of the optical windows provides a solid beam of light and thus causes the photocathode PH to provide a solid electron beam. Appropriate modification would then again be made in the acceleration potentials.

Reference is now made to FIG. 8 where a typical arrangement of a matrix of characters is shown in order to illustrate the general technique of coding for an electronic typewriter. In FIG. 8 each column is designated by a respective symbol such as C1 through C11. Each row is then designated by the combination of a row signal R1 through R4 and either of signals U and L indicating upper and lower case characters.

In FIG. 8 a typical voltage pattern is shown for centering all selected characters along column 6 (where deflection compensation is required) by means of generating corresponding column voltages VC, and by providing row adjustment voltages VR. Thus, in the arrangements of FIGS. 4*a*, 4*b*, and 5*b*, provision is made to add the supplementary row and column voltages VR and VC to the horizontal and vertical deflection voltages.

It is assumed in the example of FIG. 8 that the matrix of signals would normally be focused so that the upper line of character beams would be deflected just below the line display surface by an amount which would require the addition of voltage VR to the vertical deflection beams in order to cause the display of the selected character. Thus the upper case characters in row 1 are deflected by voltage VR1 if any of those are selected and the particular character which is selected by column voltage, such as VC1, for selected character @. As another example, consider *u* which is in row 2. In this case, a voltage VR2 is applied to the vertical deflection circuit and, in addition, voltage L is added to voltage VR2 to give a total vertical deflection voltage of $VR2+VL$. This voltage would be modulated by split beam oscillator 142 of FIG. 5 where a split display and printing type tube is employed. In addition, the character *u* requires a column selector signal VC7 which is sufficient to move the character from column *c*7 over to column *c*6. If U were selected, the column selection would be the same but the row voltage would be VR2, since $VU=0$ in this example.

FIGS. 9 and 10 indicate the general arrangement of the keys of the electronic typewriter of FIG. 2. FIG. 9 shows the keys for a column selection type of system such as is illustrated in FIG. 4, and FIG. 10 shows the keys for a grid selection for a single character as is illustrated in FIG. 5*b*. In the optical selection system of FIG. 5*a* no row or column deflection adjustment signals are required, and only a single selection signal is required for each character. The shift selection can be provided by establishing the ground return path for the selected group (upper or lower case) through the shift key switch.

In FIG. 9, actuation of the character key causes passing of a column select voltage CS*v* to a particular light L1 through L*c* (where CS*v*1 would turn on L1 and CS*v*5 would turn on L5 and so forth). Appropriate voltage deflection signals VR and VC are then switched to the horizontal and vertical deflection circuits to position the selected beam as desired. And, a space pulse is generated which causes an appropriate counting or integrating (see FIG. 12) to establish the next level of space integral signal SIG. Actuation of the shift key removes voltage VL from the vertical deflection amplifier to select upper case letters or symbols.

In FIG. 10, the row selection signal RS*v* has been added to complete the matrix selection of a particular character beam. The shift key switching is modified so as to establish separate ground return paths for upper and lower case characters. Thus each character key selects two rows through signals RS*v* (for example, row R1U and R1L) and the final row selection is made through the establishment of the ground return for the selection potential through the shift key switch.

From the above it will be understood that the term "matrix" as employed herein is not limited to a rectangular matrix of rows and columns since a spherical matrix is equally appropriate. The generic concept of the invention is the input signal selection of a particular character beam, where the term "beam" indicates any form of energy (such as electrons or light) which may be translated into a visual display and/or a printing pattern.

Various means are contemplated for accomplishing the character spacing required according to the invention. As an illustration, an arrangement is shown in FIG. 11 where an integrating capacitor CI is employed to generate the space integral signal. It will be understood, of course, that more accurate storage and representation may be accomplished through the use of a flip-flop counter having a number of stages corresponding to the logarithm to the base 2 of the number of spaces desired. In the counter arrangement a digital number representing the desired printing or typing location is translated into an analog deflection control signal through appropriate means now well known in the art.

In the illustrative arrangement of space signals integrator circuit 300 shown in FIG. 11 a plurality of differentiating circuits 312–316 are arranged to receive positive input pulses from a typewriter keyboard or from a computer. Circuits 312–315 are coupled through respective diodes which pass the negative trailing edge of the input pulses to standard pulse generators 332–335, respectively. Four standard pulse generators and associated input circuits are shown to correspond to four possible charging or counting up weights for characters. This is shown to indicate the possibility of variably spaced type such as the IBM Executive type or other printing type where the character spaces vary.

Each of standard pulse generators 332–335 (which may be monostable multivibrators having regulated amplitude and width output pulses) produces an output pulse representing the corresponding character. Production of the character is initiated by means such as a space bar movement which is then translated into a charging signal through a respective charging circuit 342–345. Circuit 342 illustrates a typical arrangement where an input capacitor CA applies a pulse to the base of a transistor having a base input impedance BL and a collector output impedance CL connected thereto. The output pulse CP2 produced thereby provides an amount of charging energy which is directly related to the particular key or computer input signal applied to differentiator circuit 312. It will be noted that it is the key return which is effective to cause the change of space representation in circuit 300 so that no character beam movement is effected until after the particular beam is first translated into a display and/or printing pattern.

Charging pulses CP2–CP5 are then passed through respective diodes 352–355 to capacitor CI which integrates the pulses to provide the space position or space integral output signal for circuit 300. A similar arrangement of differentiator 316, diode 326, standard pulse generator 336, discharge circuit 346 producing discharge pulse DP1 and diode 356 is provided to receive back space signals from switch BS. This is illustrated as a single unit of space as compared to units of 2–5 for the other circuits. It will be understood, however, that the same arrangement is appropriate for all unit spacing forward and reverse for all characters as is the case for a standard typewriter. Discharge pulse DP1 is then effective through diode 356 to discharge capacitor CI by one space unit.

Three other charging or discharging input paths are provided for capacitor CI. One is derived from the variable tab of a potentiometer PLM which is set by knob LM of the typewriter shown in FIG. 2 to the desired left-hand margin position. This voltage is then passed through switch CR when the carriage return is actuated. Switch CRNS is also shown as providing a means of applying the voltage of the potentiometer variable tap to capacitor CI. Switches CR and CRNS must be arranged to hold the contact long enough to permit the discharge of capacitor CI. This may be accomplished either mechanically or with the use of a flip-flop which is turned on by the switch and is not turned off until the voltage of CI equals the voltage of the potentiometer variable tap.

Another input to capacitor CI is derived through terminal 381 which receives the output signal produced by tab flip-flop 251 (FIG. 12). This signal is passed through diode 382 and current limiting resistor 383 (to adjust the time constant) to capacitor CI. As soon as the tab flip-flop is turned on, the beam and space integral signal SIG are caused to move to the right or forward until the signal level of SIG is equal to the next tab voltage VS which has been selected. This causes the turning off of flip-flop 251. This operation will be considered again with reference to FIG. 12.

Two other input circuits to capacitor CI are shown for translating the actuation of switches FO and RE into voltage level changes. Switch FO operates on circuit 360 to close a switch 361 to pass a suitable positive voltage through a current limiting resistor 362 to capacitor CI for charging to cause forward movement of the electronic carriage. Switch RE causes the closing of a contact 371 which passes negative voltage for discharge through limiting resistor 372 to capacitor CI.

Reference is now made to FIG. 12 where a suitable electronic tab circuit is illustrated. The shown circuit is frequently called a multiar circuit. A vacuum tube circuit of the multiar type is shown in "Waveforms," by Chance et al., volume 19, page 343 of the Radiation Laboratory Series, McGraw-Hill, 1949. The tab position is selected by inserting a tab position plug TP into a socket TS which provides a signal for a corresponding contact of a tab stepping relay or solenoid TSR. Each plug selected provides a voltage SV passed through an appropriate input impedance and a diode so that the particular socket to which it is connected will receive a voltage designating the space of the tab for the particular contact position of relay TSR.

Actuation of the tab key then turns off flip-flop 251 causing the charging of capacitor CI as mentioned above. This causes the increase of level of signal SIG which is applied to one end of winding PTI of a pulse transformer PT. The other end of winding PT1 is connected to a parallel RC coupling circuit 252, the output of which is passed through a diode 253 to the rotary contact of relay TSR. This contact is caused to step forward each time the tab key is actuated so that the first actuation would position the rotary contact to receive the first tab voltage which has been selected (such as SV5 through TP5 in FIG. 2).

As soon as the level of signal SIG reaches the selected tab voltage, which means that the electronic carriage position is at the desired tab position, a pulse of current begins to pass through a capacitor 254 to develop a voltage across load resistor 255 and cause a positive signal to pass through diode 256 to the base of a transistor 258 having a base load resistor 257. This causes transistor 258 (NPN type) to conduct and draw current through winding PT2 of pulse transformer PT. The pulse applied to winding PT2 is coupled to output winding PT3 of transformer PT to the off circuit of tab flip-flop 251, turning it off. Thus, in this manner, the electronic carriage is caused to move to the right until the position thereof corresponds to the next tab position which has been selected.

The next time the tab key is actuated, the next successive tab voltage will be applied to relay TSR and the same operation will be performed as discussed above. Actuation of the carriage return causes resetting of the stepping relay TSR to the zero position, to await the first tab signal for the next line.

In the discussion thus far it has sometimes been assumed that the input signals are derived through a typewriter keyboard. However, all of the electronic typewriter circuits mentioned above may be controlled by electronic input signals derived from a computer or other source. A typical coding arrangement is illustrated in FIG. 13*a*, which may be mechanized through an arrangement of the type shown in FIG. 13*b*.

In FIG. 13*a* each of the column selections C1–C11 is represented by a binary code. Only two column selections are shown, one for column C1 (binary code 0001) and one for column C2 (binary code 0010). Column C0 represents the lack of character selection and would be appropriate for a space signal. In a similar manner each row is coded in binary form, R1 being 01, R2 being 10, R3 being 11, and R4 being 00. Finally, upper and lower case is designated by a single binary digit with binary 1 representing upper case letters (U) and binary 0 representing lower case letters (L). Several blank character codes are possible. One set where column 0 is specified in arranged as: -0000--, indicated that the first, sixth and seventh binary digits may be either 0 or 1 as long as the second through fourth digits are zeros. The other blank possibilities are -11----.

Each character code is therefore represented by seven binary digits, the code for "S," for example, being: 1001011.

In FIG. 13*b*, the computer code signals discussed above are received by a register REG which stores them for translation. A column matrix produces the appropriate column selection and deflection signals, and a row matrix produces the appropriate row selection and deflection signals. Matrices of this type are now well known in the art, reference being made, for example, to Patent Nos. 2,476,066 and 2,579,716 to Rochester; and 2,576,026 to Meacham, where suitable matrices and gating circuits are shown. A flip-flop and gating circuit $T_1^u$ is shown which translates the U/L binary bit into appropriate shift signals as discussed above.

The invention may be used for computer entry where no printing is to be performed. Such an arrangement is shown in FIG. 14. In this case the key signals from the entry typewriter are applied to a code signal generator CSG which generates output signals in the desired computer code which may be a code similar to that illustrated in FIG. 13*a*. These code signals are then applied to the code storage device CSD which passes the signals to a gating matrix GM the output of which is applied to a transitory memory TM, such as a magnetic drum or disc circulating register. Matrix GM is controlled by sector selection device SS which in turn receives digital selection signals from an analog to digital converter ADC which itself receives the space integral signal indicating the desired location for the particular character. Whenever a character key is actuated, to cause a display, as discussed above, entry is made into the transitory memory TM in a sector position corresponding to the space position for the character.

When a change is desired to be made before transfer to permanent memory PEM through gate GT, the operator merely moves the electronic carriage to the position where the change is to be made and actuates the erase circuit for the character and then generates a new set of character signals. This new set of signals will be entered into the transitory memory in the appropriate sector, replacing the previous digital set entered there. Then, at the end of a line, or at any time that it is desired to transfer the correct transitory information in memory TM to memory PEM, a signal is generated which causes the opening gate GT to transfer the information to memory PEM. Gate GT may, of course, include appropriate means (not shown) for addressing the receiving location in memory PEM.

The device of this invention may be controlled by digital logic circuits rather than by analog circuits. A typical digital circuit is shown in FIG. 15.

In FIG. 15, a column deflection signal pulse source 700 is adapted to generate indexing pulses which are used to control the left to right indexing of the symbol across the face of the display tube. Pulse source 700 is connected through an OR gate 706, thence through an AND gate 708 to the input A of counter 710.

A back space signal pulse source 702, adapted to generate indexing pulses which are used to control the indexing from right to left of the symbol across the face of the display tube, is connected to the input B of counter 710.

The voltage applied to deflection storage condenser C1 is connected to be controlled, through a digital to analog converter 712, by the output of counter 710. Counter 710 has sufficient counting capacity to count the total number of spaces across a line of symbols. A small conventional counter of a suitable kind (but with only a counting capacity of 8) is shown—by way of example only—in FIG. 16.

FIGS. 15 and 16 also incorporate a left margin counter 714 which is adapted to set the counter 710 to a predetermined position, determined by the setting of the signals on lines F, G and H, whenever a signal is applied to line L.

A reset signal $R_E$ is applied through OR gate 716 to input L of left margin counter 714. The output of OR gate 716 is also applied through an inverting amplifier 718 to the input of AND gate 708. A second input to OR gate 716 is connected through switch 720 to an appropriate output terminal of counter 710 to apply a signal to the input of OR gate 716 when the line of symbols reaches a predetermined right position indicating the end of the line.

The end of the line signal, which is connected from a predetermined output terminal of counter 710 to switch 70 is also connected through an inverting amplifier 722 to the input of AND gate 724.

A timed pulse source 726 is connected to an input of AND gate 724. A third input, labeled $F_O$, is connected to AND gate 724. The output of AND gate 724 is connected through OR gate 706 and AND gate 708 to the A input of counter 710.

A tabular command signal source 728 is connected through a flip-flop or multivibrator 730 to the input of OR gate 706, thence through AND gate 708 to the A input of counter 710. Flip-flop 730 is adapted to generate only one pulse.

The tabular command signal 728 is also connected to the input of AND gate 732. A second input to AND gate 732 is connected to the output of timed pulse source 726. A third input to AND gate 732 is connected through an inverting amplifier 734 to the output of OR gate 736. OR gate 736 has a plurality of input terminals equal in number to the desired number of tabular stops. Each of the input terminals of OR gate 736 is adapted to be connected to a different predetermined output terminal of counter 710. The output connection of AND gate 732 is connected through OR gate 706 and AND gate 708 to the A input of counter matrix 710.

In operation, column deflection signal pulses are received from column deflection signal pulse source 700, and are channeled through OR gate 706 and AND gate 708 as long as there is no signal at the output of OR gate 716. If there is a signal at the output of OR gate 716, signals from the output of OR gate 706 are inhibited by AND gate 708 to prevent their transmission to the A input of counter 710.

Each pulse which appears at the A input of counter matrix 710 causes counter matrix 710 to increase one binary count to cause different terminals successively to be placed in a "1" state. The presence of "1" at different terminals of the output of counter matrix 710 causes different analogue signals to be applied to deflection capacitor C1 to cause deflection of the character position along a line of symbols on the face of the cathode ray tube.

An output pulse from flip-flop 730 causes counter 710 to increase one count. An output of AND gate 724 causes counter 710 to count rapidly, due to the presence of timed pulses from timed pulse source 726, to the end of the line at some predetermined position determined by the connection marked TRM on counter 710.

Outputs of AND gate 732 cause the counter 710 to count for as long as the outputs occur.

If it is desired to back space, back space signal pulse source 702 applies pulses to input B of counter 710 to cause the count to decrease and the signal position determined by the charge on condenser C1 to move toward the left.

If it is desired to return to the left end of a line, a signal may be appiled at $R_E$. Similarly, a signal may be applied automatically if switch 720 is closed, when the counter reaches a predetermined position designated by the terminal TRM of counter matrix 710. The presence of a signal on either input of OR gate 716 deenergizes the output of inverting amplifier 718 which inhibits signal flow through gate 708 to prevent signals from being applied to the A terminal of counter matrix 710. At the same time, a signal is applied to the L input of left margin counter 714 which causes the counter 710 to be set to a count determined by the signals which area applied to input terminal F, G and H of left margin counter 714. Thus, the output of capacitor C1 jumps to a left hand margin position as rapidly as the time constant of the circuit allows.

To provide tabular stops, the inputs of OR gate 736 are connected to various output terminals of counter 710. Each of the input terminals of OR gate 736 represents a different tabular stop and each of the output terminals of counter matrix 710 represents a different character position along a line of symbols. As long as the character position on the face of the tube is not in a position which corresponds to a terminal to which one of the inputs or OR gate 736 is connected, a signal appears at the output of inverting amplifier 734. When, however, the position of the character coincides with a predetermined tabular position, the output of inverting amplifier 734 is deenergized which opens gate 732 to inhibit the flow of timed pulses from time pulse source 726 to the A input of counter 710. When a tabular command signal 728 is applied, timed pulses are transferred to the output of AND gate 732 if the character position does not coincide with one of the predetermined tabular positions corresponding to the connections to the input of OR gate 736. Frequently, however, it is desired to index from one tabular stop to the next tabular stop. Assuming that the character position is positioned upon one particular tabular stop position and it is desired to index to the next tabular stop, no output occurs at AND gate 732 because of the absence of one of the required signals. However, flip-flop 730 is commanded to generate a signal pulse which indexes the character position one space, thereby generating a signal at the output of amplifier 734 to open AND gate 732 and to allow the timed pulses from timed pulse source 726 to continue the indexing of the character until the next consecutive tabular stop position is reached.

Referring to FIG. 16, three SR type flip-flops are shown to generate a count of only eight, with output terminals numbered from 000 to 111. The counter of FIG. 16 is shown by way of example. In a typical typewriter, perhaps as many as a hundred character column positions would be required. In which event a counter which is capable of counting to a hundred would be needed.

SR flip-flops have the characteristic that when signals are simultaneously applied to both the S and R input terminals, the flip-flop changes state reliably. The S terminal is sometimes called the set terminal or the one-set terminal while the R input terminal is frequently called the reset or the zero-set terminal.

The flip-flops are shown labeled C, D and E with output terminals C, $\overline{C}$, D, $\overline{D}$, E and $\overline{E}$. The input terminals are respectively $S_C$, $R_C$, $S_D$, $R_D$, $S_E$, and $R_E$. The circuit of FIG. 16 mechanizes the equations:

$$S_C = ADE + LF$$
$$R_C = B\overline{D}\overline{C} + L\overline{F}$$
$$S_D = AE - BC\overline{E} - LG$$
$$R_D = A\overline{C}E + B\overline{E} + L\overline{G}$$
$$S_E = A + B(C + D) + LH$$
$$R_E = A(\overline{C} + \overline{D}) + B + L\overline{H}$$

Thus, the device which is shown in FIGS. 15 and 16 provide a binary digital mechanization of the typewriter control.

From the foregoing description it should be apparent that the invention provides a basic technique for translating electrical input signals into a character beam which may be displayed for the purpose of editing and correction prior to entry into computer or prior to printing.

The same means provided by the invention may also be used in high speed printing where the output of a computer is used to actuate various circuits of an electronic typewriter and may also be used as a typewriter input or printing device where keyboard signals are generated to designate the particular character which is to be printed and/or displayed.

Many suitable types of circuits and arrangements have been discussed herein. It will be understood, however, that these circuits and arrangements are merely illustrative of the general approach suggested by the invention. In particular, electrostatic deflection plates have been shown in the various cathode ray tube arrangements which have been suggested. It will be understood that an electromagnetic deflection may be equally suitable. It will also be understood that whenever the term cathode ray is employed herein it is intended to cover any equivalent to the typical vacuum tube type of tube and to cover other arrangements where the cathode may not be thermionic but may generate light beam directly.

The important functions of the present invention are merely that a beam of any type of energy can be selectively generated under the control of electrical input signals representing characters and spaces required therefor and that this beam may then be physically positioned in space by any type of deflection means whether it be electrical or be the rotation of deflecting surfaces to a desired space position, the space position being derived as a function of the integral count or summation of the previously generated space signals.

It has been pointed out that space signal integrator may consist, in a simple case, of a simple integrating capacitor such as CI discussed above. However, where high accuracy is desired a digital counter may be employed with appropriate digital-to-analog conversion means to accomplish the physical deflection.

It has been suggested that the character beam may be derived optically or electronically, and that the electron beam in the tube may be generated by thermal emission or by photoemission from the cathode.

The invention has been described for use as an electronic typewriter, a high speed printing device, as a display device, as a computer input device, and as a computer output device. Various other combinations which employ the inventive principles as a selective beam generating device with space signal integrating or counting are possible.

Accordingly, it is recognized that the invention may find other applications beyond those discussed above and therefore it is not the intention herein to limit the use of the invention to the particular methods which have been discussed. The scope of the invention is limited only by the appended claims.

We claim:

1. An arrangement for electronically composing a line of type for display or printing or both, said arrangement comprising: first means for generating matrix selection signals designating a particular location of a selected character; second means responsive to said matrix selection signals for producing a beam of energy having a shape corresponding to the character selected; third means for producing character space-indicating signals, a space-indicating signal being produced for each character; and means responsive to said space-indicating signals for producing a beam position signal for positioning the beam along said line of type according to the value of the sum of said character space-indicating signals wherein said means for positioning comprises space integrating means for providing a deflection signal for said beam of energy for location thereof, said space integrating means being synchronized with selection of characters through said selection means.

2. A line-at-a-time printing device comprising: selectively actuable first means for producing a beam of energy representing a particular character, each character having a predesignated space requirement in a printing line; second means for developing a space-integral signal corresponding to the summation of all space requirements of character beams which are generated by the said first means; third means responsive to said space-integral signal for positioning each character beam which is produced to successive line positions according to the value of said space-integral signal; wherein said means for positioning comprises space integrating means for providing a deflection signal for said beam of energy for location thereof, said space integrating means being synchronized with selection of characters through said selection mean; and fourth means responsive to said beam of energy for producing a pattern presentation of each beam capable of being translated into visible print.

References Cited by the Examiner

UNITED STATES PATENTS

| | | | |
|---|---|---|---|
| 2,951,121 | 8/1960 | Conrad | 178—30 |
| 3,012,239 | 12/1961 | Clemens et al. | 178—15 |
| 3,020,530 | 2/1962 | Volberg | 178—15 |
| 3,047,851 | 7/1962 | Palmiter | 178—15 |
| 3,090,041 | 5/1963 | Dell | 178—15 |
| 3,132,206 | 5/1964 | King | 178—15 |
| 3,166,636 | 1/1965 | Rutland et al. | 178—24 |

NEIL C. READ, *Primary Examiner.*

T. A. ROBINSON, *Assistant Examiner.*